Figure 1:
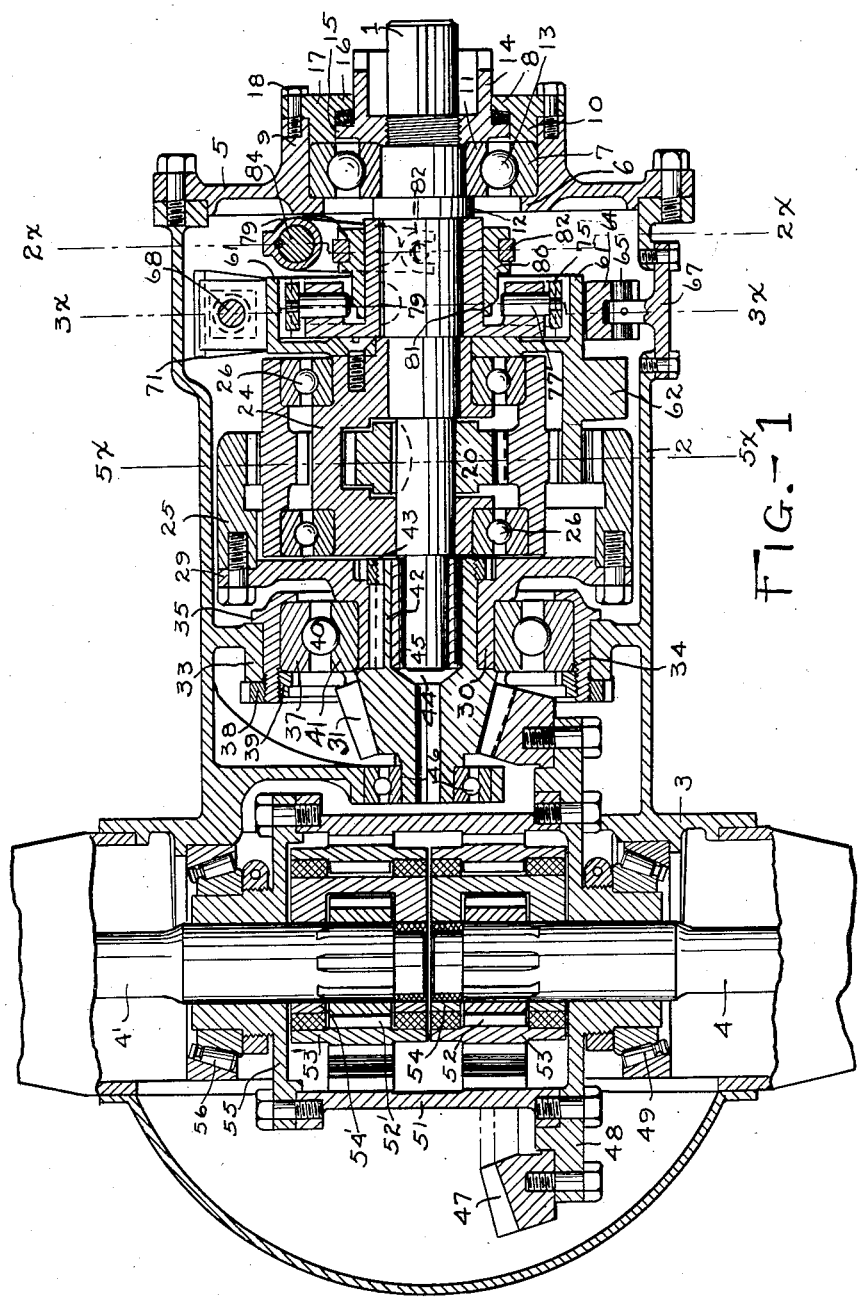

June 28, 1927.

J. BETHUNE ET AL 1,634,091

VARIABLE SPEED GEAR FOR MOTOR VEHICLES

Filed Nov. 10, 1926    3 Sheets-Sheet 2

Inventors
John Bethune and
Jacob G. Van Roo, deceased,
by Elizabeth F. Van Roo,
Executrix.

By Bates Macklin Golrick & Teare
Attorneys

June 28, 1927.

J. BETHUNE ET AL 1,634,091

VARIABLE SPEED GEAR FOR MOTOR VEHICLES

Filed Nov. 10, 1926    3 Sheets-Sheet 3

Inventors,
John Bethune and
Jacob G. Van Roo, deceased,
by Elizabeth F. Van Roo,
Executrix.

By Bates, Macklin, Gabriel & Teare
Attorneys

Patented June 28, 1927.

1,634,091

UNITED STATES PATENT OFFICE.

JOHN BETHUNE, OF ROCHESTER, AND JACOB G. VAN ROO, DECEASED, LATE OF ROCHESTER, NEW YORK; BY ELIZABETH F. VAN ROO, EXECUTRIX, OF ROCHESTER, NEW YORK, ASSIGNORS TO TWIN HIGH TRANSMISSION COMPANY, OF SYRACUSE, NEW YORK, A CORPORATION OF NEW YORK.

VARIABLE-SPEED GEAR FOR MOTOR VEHICLES.

Application filed November 10, 1926, Serial No. 147,576, and in Canada January 14, 1926.

Our invention relates to variable speed gearing for automobiles and has for its object to provide a gearing of this kind which is adapted to transmit the normal speed of the main transmission shaft to the differential or rear axle without change or at a changed rate of speed and which at the same time is simple in construction and substantially noiseless in operation. Another object of our invention is to provide a variable speed gear of this kind in combination with a friction clutch having a slipping or breaking action adapted to increase the speed transmitted to the rear axle from substantially zero to that of the main transmission shaft.

More specifically it is the object of our invention to provide a variable speed gear for power driven vehicles having an internal external gear mounted on a freely revoluble eccentric bearing controlled by a manually operated friction clutch.

To these and other ends our invention resides in certain combinations and improvements of parts as hereinafter more fully described, and particularly pointed out in the claims at the end of this specification.

Figure 2:
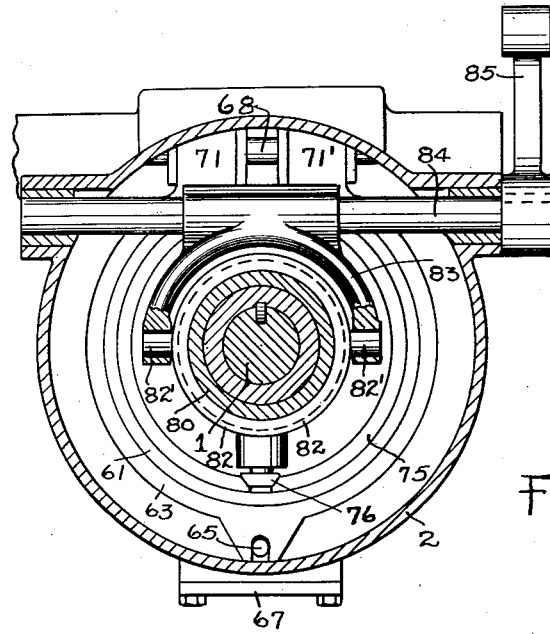
Figure 3:
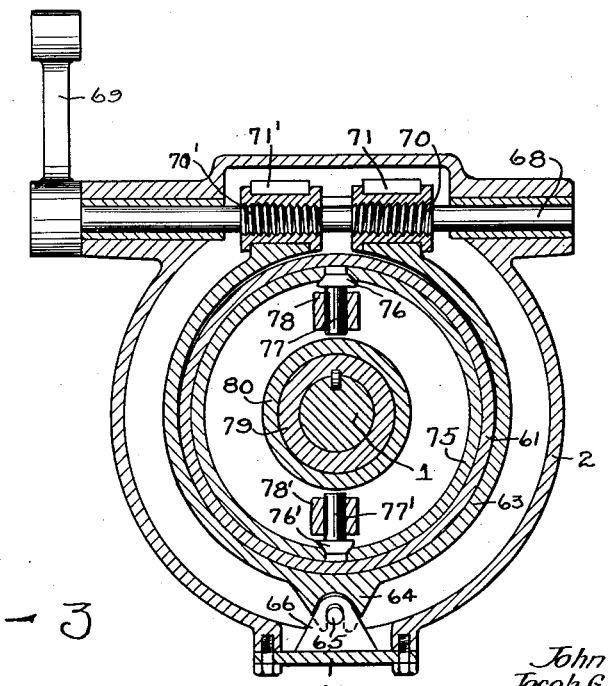
Figure 5:
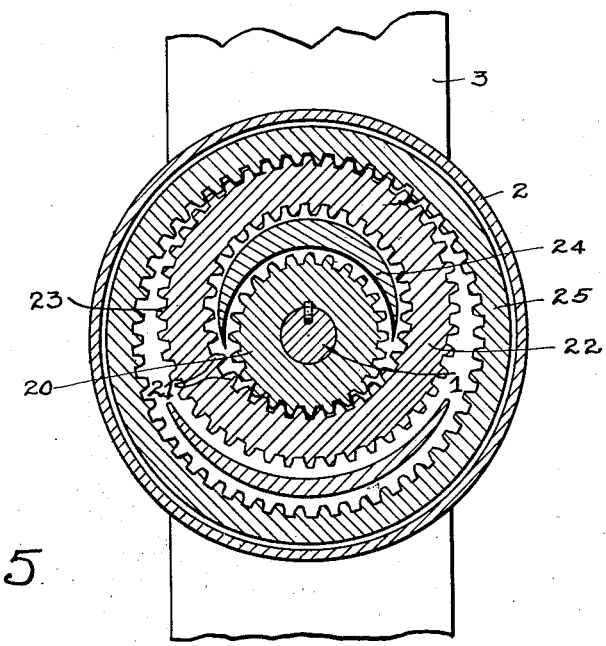
Figure 4:
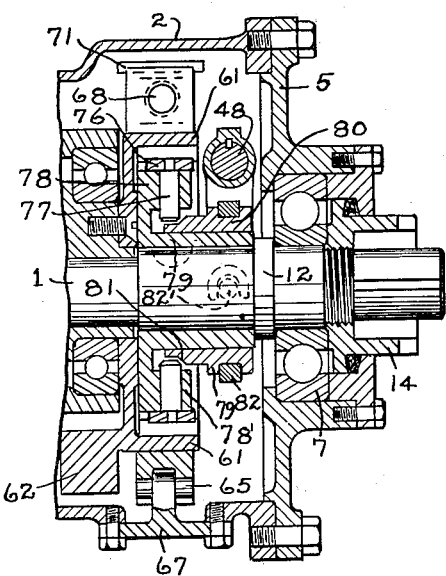

In the drawings:

Fig. 1 is a horizontal section through the transmission shaft and rear axle of a motor vehicle illustrating one application of our invention, Fig. 2 is a section on the line 2ˣ—2ˣ in Fig. 1, Fig. 3 is a section on the line 3ˣ—3ˣ in Fig. 1, Fig. 4 is a fragmentary view of the right end of Fig. 1 showing the clutching devices in different positions, and Fig. 5 is a section on the line 5ˣ—5ˣ in Fig. 1.

Similar reference numerals refer to the same parts in all the figures of the drawings.

In the present application, we show our improved variable speed devices applied to the rear end of the transmission shaft 1 of a motor driven vehicle, although it will be understood that said devices may be applied at any point in the transmission devices, without departing from the spirit or scope of our invention. In the present instance, the rear end of the shaft 1 has a bearing in a housing 2 which may be connected with or made as a part of the housing 3 on the rear axle 4 in which the differential gears are mounted. The housing 2 is cylindrical in form and closed at its forward end by means of a detachable member or cover 5 secured in position by means of machine bolts or other suitable means. The member 5 is provided with a central opening in which a bearing for the shaft 1 is mounted. For this purpose, said opening is provided with an inwardly projecting flange 6 against which a roller bearing retaining member 7 is mounted and held in position by the member 8. For this purpose the member 5 has a forwardly projecting flange 9 in which the member 7 is mounted, and the member 8 has an inwardly projecting portion 10 which engages the bearing member 7 to hold it in position. A bearing member 11 is mounted on the shaft 1 concentric with the bearing member 7 and held against rearward movement by means of a collar 12 on the shaft 1. Anti-friction ball bearings 13 may be mounted between the members 7 and 11 if desired. Mounted on the shaft 1 and engaging the bearing member 11 is a tubular member 14 having an outwardly extending flange 15 cooperating with an inwardly extending flange 16 on the member 17. The member 17 is tubular in form and fits into the flange 9 to which it is secured by any suitable means as by the machine bolts 18 threaded into the flange 9 and extending through openings provided therefor, in the member 17. If desired a stuffing box may be provided between the flanges 15 and 16 and the member 14 threaded on the shaft 1 to be adjustable thereon.

Secured to the shaft 1 within the housing 2, to rotate therewith by means of a key or other suitable means is a pinion or gear wheel 20. The gear 20 meshes with the internal teeth 21 of an internal external gear 22, the external teeth 23 of which mesh with the teeth of an internal gear 25. The internal external gear 22 is mounted to rotate freely on an eccentrically mounted bearing 24, and if desired, may turn on anti-friction ball bearings 26 as illustrated. The bearing member 24 is mounted to turn freely about the shaft 1 and may have a bearing directly on the said shaft, if desired, the intermediate portion being cut away as shown to accommodate the gear 20.

Secured to or formed integral with the internal gear 25 is the bearing member 29, having a rearwardly extending hub portion 30 to which the beveled pinion 31 is connected. We have herein shown the gear 25 secured to the member 29 by machine bolts and supported on bearings mounted in the rear end of the housing 2. A flange 33 is formed integral with or secured in the housing 2 and has a circular opening therein in which a ring 34 is mounted. The ring 34 at its forward end is provided with an outwardly projecting flange 35 which engages the member 33 and an inwardly projecting flange 36 which engages the forward side of a bearing ring 37. The rear end of the ring 34 is threaded externally to receive the retaining ring 38 which engages the rear face of the member 33 in which the ring or sleeve 34 is mounted. The ring 34 is also threaded internally to receive a retaining ring 39 which engages the rear face of the bearing ring 37, mounted in the ring 37 preferably on anti-friction ball bearings 40 is a bearing member or ring 41 in which the member 30 is mounted. Extending into the rear end of the tubular portion of the member 30 and keyed thereto is a forwardly extending boss or bearing 42 integral with the beveled gear 31. The forward end of the sleeve 42 may be threaded to receive the nut 43 by which means the beveled gear 31 is secured to the member 30. The boss or forward extending portion 44 of the beveled gear 31 is bored out to provide a bearing for the rear end of the shaft 1. If desired the shaft 1, may be mounted to turn on the anti-friction roller bearings 45, as shown. The rear end of the beveled gear 31 is also supported in a bearing in or formed integral with the housing 2, and if desired, may turn on the roller bearings 46.

The beveled gear 31 is adapted to transmit motion to the rear axle of the vehicle or through any suitable differential gearing associated therewith. In said device a beveled gear 47 meshes with the gear 31 to be driven thereby. The gear 47 is secured to a disk 48 by means of machine bolts, which disk is revolubly mounted on the rear axle 4, and has a bearing 49 in the housing 3 which incloses the differential gearing. Secured to the disk 48 by machine screws is the internal gear 51 which surrounds the inner ends of the rear axles 4, and 4' adjacent their inner ends to turn therewith are the gears or pinions 52 and 52' which mesh with the internal teeth of internal external gears 53 and 53', the external teeth of which mesh with the gear 51. The gears 53 and 53' are revolubly mounted on eccentric bearing members 54 and 54' revolubly mounted on the axles 4 and 4'. The gear 51 also has a bearing on the axle 4' through the disk 55 to which it is secured and which also has a bearing 56 in the housing 50.

Means are provided for holding the eccentric bearing 24 stationary while the shaft 1 revolves relatively thereto when the speed transmitted to the pinion 31 is reduced through the action of the gears 20, 22 and 25, or to permit the eccentric bearing to turn freely with the shaft 1, when the gears 20, 22 and 25 turn as a unit with the shaft and its speed is transmitted to the pinion 31 without change. To this end, the eccentric bearing member 24 has a clutch member 60 secured to its forward end by means of flat headed screws. The member 60 has a forwardly projecting ring or cup shaped portion 61, and diametrically opposite the point of greatest eccentricity of the member 24 is a rearwardly extending portion 62 which may be enlarged to serve as a counterweight for the eccentric bearing member and its pinion. Cooperating with clutch member 61 and surrounding the same is a clutch member 63 in the form of a split ring supported in the housing 2 and under control of the driver. The clutch member 63 is provided with a slotted projection 64 by means of which it is seated on a pin 65 mounted in a projection 66 on a plate 67 secured in an opening in the casing 2 by means of machine bolts or other suitable means. Mounted in the casing 2 diametrically opposite the pin 65, to turn in bearings provided therefor is a clutch operating member in the form of a rod or shaft 68. The shaft 68 projects beyond its bearings at one end where it has a crank arm 69 keyed thereto and by which the shaft may be operated. Intermediate its ends and within the housing 2, the shaft 68 is provided with right and left hand screw threads 70 and 70', which cooperate with nuts or blocks 71 and 71' threaded thereon and operatively engaging the opposite ends of the split ring 63. It will be noted that when the rod 68 is rotated in one direction the blocks 71 and 71' are moved to approach each other causing a contraction of the ring 63 which frictionally engages the member 60 and locks or holds the floating bearing member 24 against rotation. At this time the speed transmitted to the rear axle will be the slowest within the range of the parts. If now the brake ring 63 be gradually released by slowly turning the crank 69 in a reverse direction the ring 61 will slip or turn under the diminished friction of the ring 63 and gradually increase its speed until entirely released. During this operation, the speed transmitted to the rear axle is also being gradually decreased as motion through the gears 22 and 25 is increasingly taken up by slippage of the reaction member, namely, the eccentric bearing 24.

We have also provided means for clutching the eccentric bearing member 24 to the shaft 1 when the friction band 63 is released therefrom. Said means comprises an expansible friction band 75 mounted within the ring 61 on the bearing member and mounted to rotate with the shaft 1. The ring 75 is divided or made of two semi-circular clutch devices between the adjacent ends of which are the dogs or operating devices 76 and 76', which are secured to or formed integral with the outer ends of radial pins 77 and 77' slidably mounted in arms 78 and 78' formed integral with a sleeve 79 keyed to the shaft 1. Normally the clutch devices 75 are free from the ring 61 and to move them into frictional or clutching engagement with the ring 61, a sleeve 80 is slidably mounted on the sleeve 79 and has a tapered or thickened portion 81 adapted when the sleeve is moved rearwardly to engage the inner ends of the pins 77 and 77' moving them outwardly and forcing the cuneiform or wedge-shaped dogs 76 and 76' outwardly between the adjacent ends of the clutch members 75, spreading them apart into frictional engagement with the inner surface of the member 61, whereby the bearing member 24 is connected to the shaft 1 to rotate therewith. When the sleeve 80 is again moved forwardly out of engagement with the pins 77 and 77', the clutch members 75 are permitted to contract and release the ring 61. Operating means are provided for the sleeve 80, said means comprise a circumferential groove formed on the sleeve in which a ring 82 has a bearing. Said ring is provided with diametrically opposite projections or pins 82' which are engaged by a yoke or fork 83, splined to a rock-shaft 84 which has a bearing in the housing 2. Splined to one end of the shaft 84 is a crank arm 85 by means of which the shaft may be operated to engage or disengage the clutch members 75. The crank arms 69 and 85 may be connected to be operated simultaneously so that the friction devices 63 and 75 may be operated simultaneously to engage and release the ring 61, or vice versa, however the ring 63 is operated to disengage the ring 61, slightly in advance of its being locked to the shaft 1 by the action of the devices 75.

We claim:

1. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, frictional means for connecting said bearing member to the driving shaft to rotate therewith, means for holding said bearing member against rotation when said frictional means is released, and a gear operatively connecting the internal external gear with the driven member.

2. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a housing for said gears, frictional means mounted in said housing and adapted to engage said bearing member, releasable means for connecting said bearing member with the driving shaft to rotate therewith, and means operatively connecting said internal external gear with the driven member.

3. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a housing for said gears, a friction ring on said eccentric bearing member, a rock shaft in said housing, a split ring adapted to frictionally engage said friction ring, means on said rock shaft engaging the ends of said split ring for controlling the same, and means operatively connecting said internal external gear with the driven member.

4. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a housing for said gears, a friction ring on said eccentric bearing member, a split ring connected with said housing and adapted to engage said friction ring to hold said eccentric bearing member against free rotation with the driving shaft, a rock shaft in said housing for controlling the split ring, and means operatively connecting said internal external gear with the driven member.

5. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a friction ring on said eccentric bearing member, friction devices in said ring, means on said driving shaft for actuating said friction devices to engage the friction ring and connect the eccentric bearing member to the driving shaft to rotate therewith, and means operatively connecting said internal external gear with the driven member.

6. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a friction ring on said eccentric bearing member, friction devices in said ring, means on said driving shaft and movable radially for actuating said friction devices, a sleeve on said shaft for operating said radially movable means, and a gear operatively connecting said internal external gear with the driven member.

7. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a housing for said gears, a friction ring on said eccentric bearing member, friction devices in said ring, radially movable devices on said driving shaft for actuating said friction devices, a sleeve slidable on said shaft for operating said radially movable devices, a rock shaft in said housing operatively connected with said sleeve, and a gear operatively connecting said internal external gear with the driven member.

8. In a variable speed gearing for motor vehicles, the combination of a driving shaft, a driven member, a gear mounted on the driving shaft to turn therewith, an internal external gear engaged by the first mentioned gear, an eccentric bearing for said internal external gear revolubly mounted on said driving shaft, a housing for said gears, a friction clutch member on said eccentric bearing, a clutch device connected with said housing and adapted to engage said clutch member to hold the bearing against rotation, or to disengage it and permit the bearing to rotate freely with the driving shaft, a second clutch device connected with the driving shaft and adapted to engage said clutch member when the first mentioned clutch device is inoperative to connect the bearing with the driving shaft, means for operating said clutches, and a gear operatively connecting said internal external gear with the driven member.

9. In a variable speed gear for motor vehicles, the combination of a driving shaft, a driven member, a gear keyed to said driving shaft to rotate therewith, a bearing member revolubly mounted on said shaft and eccentric thereto, an internal external gear mounted on said bearing member and meshing with said first mentioned gear, a housing for said gears, a friction clutch for connecting said bearing member with the driving shaft to rotate therewith, a second friction clutch for connecting said bearing member with the housing to hold it from rotation when the first clutch is released, means for operating said clutches, and a gear operatively connecting said internal external gear with the driven member.

10. In a variable speed gear for motor vehicles, the combination of a driving shaft, a driven member, a gear keyed to said driving shaft to rotate therewith, a bearing member revolubly mounted on said shaft and eccentric thereto, an internal external gear mounted on said bearing member and meshing with said first mentioned gear, a housing for said gears, a friction clutch for connecting said bearing member with the driving shaft to rotate therewith, a second friction clutch for connecting said bearing member with the housing to hold it from rotation when the first clutch is released, means for operating said clutches, an internal gear meshing with said internal external gear and having a bearing in said housing, and means associated with said internal gear for operating the driven member.

11. In a variable speed gear for motor vehicles, the combination of a driving shaft, a driven member, a gear keyed to said driving shaft to rotate therewith, a bearing member revolubly mounted on said shaft and eccentric thereto, an internal external gear mounted on said bearing member and meshing with said first mentioned gear, a housing for said gears, a friction clutch for connecting said bearing member with the driving shaft to rotate therewith, a second friction clutch for connecting said bearing member with the housing to hold it from rotation when the first clutch is released, means for operating said clutches, an internal gear meshing with said internal external gear and having a bearing in said housing, a gear keyed to said internal gear and adapted to operate the driven member, and a bearing for said driving shaft in said internal gear.

In testimony whereof we hereunto affix our signatures.

JOHN BETHUNE.
ELIZABETH F. VAN ROO,
*Executrix of Jacob G. Van Roo, Deceased.*